United States Patent [19]

Hof et al.

[11] 4,299,727

[45] Nov. 10, 1981

[54] DISPOSABLE REVERSIBLE THERMOMETER

[75] Inventors: Craig R. Hof, Hopatcong; Concepcion Osio, Jersey City; Roy A. Ulin, Wyckoff, all of N.J.

[73] Assignee: Akzona Incorporated, Asheville, N.C.

[21] Appl. No.: 104,411

[22] Filed: Jan. 7, 1980

[51] Int. Cl.³ .................. C09K 3/00; G01K 11/06; G01K 11/08; G01K 11/12; G01K 11/16
[52] U.S. Cl. ........................ 252/408; 23/230 R; 73/356; 73/358; 116/207; 116/217
[58] Field of Search ............... 73/356, 358; 252/408; 23/230 R; 116/207, 217

[56] References Cited

U.S. PATENT DOCUMENTS

| | | | |
|---|---|---|---|
| 2,261,473 | 11/1941 | Jennings | 73/356 |
| 2,269,038 | 1/1942 | Perry | 73/356 |
| 3,465,590 | 9/1969 | Kluth et al. | 73/356 |
| 3,946,612 | 3/1976 | Saci et al. | 73/358 |
| 3,956,153 | 5/1976 | Chadha | 73/356 |
| 3,980,581 | 9/1976 | Godset, Jr. et al. | 73/356 |
| 4,150,572 | 4/1979 | Lindquist | 73/356 |
| 4,154,106 | 5/1979 | Inoue et al. | 73/356 |
| 4,232,552 | 11/1980 | Hof et al. | 252/408 |

FOREIGN PATENT DOCUMENTS

| | | | |
|---|---|---|---|
| 2738253 | 3/1979 | Fed. Rep. of Germany | 73/356 |
| 1350174 | 4/1974 | United Kingdom | 73/356 |
| 1360862 | 7/1974 | United Kingdom | 252/408 |
| 1367703 | 9/1974 | United Kingdom | 73/356 |
| 1370045 | 10/1974 | United Kingdom | 252/408 |
| 1377174 | 12/1974 | United Kingdom | 252/408 |
| 1384621 | 2/1975 | United Kingdom | 252/408 |
| 1402601 | 8/1975 | United Kingdom | 252/408 |
| 1412976 | 11/1975 | United Kingdom | 252/408 |
| 1487186 | 9/1977 | United Kingdom | 252/408 |
| 626366 | 9/1978 | U.S.S.R. | 73/356 |

Primary Examiner—Teddy S. Gron
Attorney, Agent, or Firm—Robert H. Falk; Charles A. Wendel; Francis W. Young

[57] ABSTRACT

A new and useful composition of matter is disclosed, having one utility for use in a disposable, reversible thermometer. The novel composition of matter comprises (1) a suitable heat-sensitive composition (for example, as described in U.S. Pat. No. 4,232,552); (2) a suitable matrix-forming amorphous material; and (3) a suitable film-forming material that is more crystalline than the matrix-forming amorphous compound. Preferably, the composition also contains a solubilizing compound.

15 Claims, 1 Drawing Figure

DISPOSABLE REVERSIBLE THERMOMETER

BACKGROUND OF THE INVENTION

Applicants claim this application as a continuation-in-part of copending application Ser. No. 946,935, filed Sept. 28, 1978, now U.S. Pat. No. 4,232,552 which is incorporated herein by reference. The claim has been denied.

Field of the Invention

The present invention relates to the field of thermometry, and most notably to an improvement to the invention taught in Ser. No. 946,935 which discloses certain novel temperature-indicating compositions of matter (which may be referred to hereafter as NTICM) in disposable and reversible thermometers. Problems, however, have arisen in applying those compositions to webs for assembly as disposable thermometers. Among the difficulties encountered are (1) the inability to obtain a full dot of color because of formation of a "donut" around the web cavity, (2) problems in containing the liquid phase of the temperature indicating composition of matter, and (3) problems in maintaining a stable super-cooled temperature indicating composition of matter for extended periods of time.

State of the Art

U.S. Pat. No. 4,150,572 to Lindquist (1979), not admitted as prior art herein, discloses a reversible thermometer including a heat sensitive material which undergoes a reversible visible color change from a crystalline solid to a viscous mass at a predetermined temperature, said heat sensitive material comprising an individual or mixture of low molecular weight organic compounds and a polymer, said polymer being present in the mixture in an amount effective to retard the crystallization of said organic compounds between temperatures of from about room temperature to said predetermined temperature.

In Ser. No. 946,935 of Applicants, a teaching is made of the use of certain solvents, for example, a combination of ortho-chloronitrobenzene (OCNB) and ortho-bromonitrobenzene (OBNB) for use in disposable thermometers.

The matrix-forming amorphous and film-forming materials selected for use in the present invention have the characteristic of being insoluble in the OBNB/OCNB. Further, additives are used to increase the solubility of the materials in OBNC/OCNB at high temperature but to still allow the additives to separate (precipitate) as the temperature of the composition approaches the temperature measuring point of the OBNB/OCNB. This fact has been verified by DSC analysis in which purity of OCNB/OBNB was found to be 99.8-99.9%. The total composition consisted of about 48% OCNB/OBNB.

In column 5, line 6, Lindquist teaches, "The polymer must be soluble in said organic compound at said predetermined temperature in order to obtain the benefits of this invention." By predetermined temperature of said organic compound, he refers to the melting point of the heat sensitive material. This is directly contrary to one of the teachings of the instant invention, which is to provide a matrix of materials which is insoluble in the heat sensitive material at the melting point.

Lindquist, in column 4, line 41, discloses that the visible change is not linked to the melting point. From this, it is implied that the temperature measurment is given by the solidus curve of the phase relationship. The indicated temperature in the present invention is made by the liquidus curve of the phase relationship—the temperature at which the NTICM is 100% melted.

Also, it has been our general experience that polymers which dissolve in the NTICM tend to render the phase/color change mechanism inoperable. This is due to the formation of a "liquid" phase in which the color change compounds dissolve. The net effect is to make both solid and liquid phases the same color.

Of interest further is Inoue et al., U.S. Pat. No. 4,154,106, which provides a disposable temperature indicator utilizing a change in condition of organic compounds at their melting point for the indication of temperature.

The Prior Art

Prior to the invention disclosed in Ser. No. 946,935, as described in the background section therein, disposable thermometry was generally non-reversible and was limited to "opaque" thermometers and related concepts, usually temperature measured by:

(a) the change from solid to liquid of a solvent, revealing an insoluble, non-dispersable paint or marker at the bottom of a pocket or "cup"; or (b) the change from solid to liquid of a solvent, causing an indicator to migrate from a previous non-visible layer to a visible layer; or (c) the change from solid to liquid of a solvent, causing an acid or base in one layer to react with a dye, causing the dye to change color.

See U.S. Pat. No. 3,465,590, col. 6, line 43-63 to Kluth et al. for an example of mode (a). See U.S. Pat. No. 3,946,612 to Sagi et al. for an example of mode (b), and U.S. Pat. No. 2,261,473 to Jennings (common solvent system) for an example of mode (c). Improvements to these concepts were minor, such as U.S. Pat. No. 3,956,153's nucleating agents to control undercooling.

As opposed to the aforesaid prior art concepts, generally disclosing non-reversible thermometry with multiple layers our copending Ser. No. 946,935 discloses the revolutionary invention and discovery that certain suitable organic moieties, when presented in a composition comprising a suitable solvent that is substantially free of impurities, change color with a change in phase.

SUMMARY OF THE INVENTION

Surprisingly, a novel composition of matter has been found which solves the aforementioned problems; the composition of matter comprises:

(a) a suitable heat-sensitive composition capable of changing color at a predetermined temperature;

(b) a suitable matrix-forming amorphous material; and (c) a suitable film-forming material that is more crystalline than said matrix-forming material.

The novel composition herein preferably contains a solubilizing compound for purposes of manufacture, as described below.

The heat-sensitive compositions capable of changing color are preferably those disclosed in our copending Ser. No. 946,935, to wit, compositions substantially free of impurities and consisting essentially of:

(a) a solvent adapted to change from a solid state to a liquid state at substantially a predetermined temperature; and (b) an effective amount of one or more suitable organic moieties dissolved in and inert towards said solvent and adapted to change the color of the composition visible to the naked eye upon the change in state at substantially the predetermined temperature when so dissolved, and selected from one or both of the groups consisting of:

(1) one or moreof a Group III body of compounds consisting of pinacyanol iodide, 1,1'-diethyl-2,2'-cyanine iodide, quinaldine red, pinacyanol chloride, thionin, methylene blue, cresol red, chlorophenol red, neutral red iodide, neutral red chloride, crystal violet, acridin orange, Orasol Orange RLN TM, Orasol Navy Blue TM, Irgalith Red PR TM, Fat Red BS TM, methyl violet, Xylene Cyanol FF TM, Rhodamine B TM, Rhodamine 6G TM, Irgalith Magneta TCB TM, Irgalith Pink TYNC TM, Toluidine Blue O TM, Savinyl Green B TM, Savinyl Blue RS TM, purpurin, 3,3'-diethylthiadicarboxyanine iodide, cryptocyanine, Dicyanine A TM, Merocyanine 540 TM, 4-(p-ethoxyphenylazo)-m-phenylene diamine monohydrochloride, Yellow Orange S TM, Chrysoidan G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, Murexide, Savinyl Blue GLS TM, Irgalith Blue GLSM TM, phthalocyanine, Di Amingreen B TM, Alizarin Blue S, Celliton Blue Extra TM, neocyanine, Janus Green TM, dimethyl yellow, Fast Yellow TM, methyl red sodium salt, Alizarin yellow R TM, Eriochrome black T TM, Chromotrope 2R TM, Ponceau 6R TM, Brilliant Ponceau G/R/2R, chromolan yellow, Sudan Red B TM, Bismarck brown G, Fat Black TM, Resorcin Brown TM, Benzofast pink 2BL TM, Oil Red EGN TM, Euroglaucine, Fushsin NB TM, parafuchsin, Patent Blue TM, Irgalith Blue TNC TM, Phloxin B TM, fluorescein sodium salt, Rhodamine B base TM, Eosinscarlet, Eosin Yellowish TM, Erythrosin extra bluish, 4'5-dibromo fluorescein, ethyleosin, Phloxine TM, Cyanovin B TM, chlorocresol green, pinacyanol bromide, 2-(p-dimethylaminostyrl)-1-ethyl pyridinium iodide, ethyl red, nigrosine, Savinyl Blue B TM, Orasol Blue BLN TM, Safranin O TM, Azocarnun G TM, Phenosafranine TM, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Thiorifolex, Acid Alizarin Red B TM, 5-Aminofluorescein, Rose Bengal TM, Martius Yellow TM, Chicago Blue 6B TM, Alcian Blue 86X TM, cresyl violet, 4,4'Bis (dimethylamino)benzylhdrol, Zinc Pthalocyanine, Sudan III TM, Pyronin Y TM, Toluylene Blue TM, cresyl violet perchlorate, Mendola's Blue TM, Phosphine Dye TM, Nitrol TM, cresyl violet acedate, ceres orange R TM, 4-phenylazo-1-naphthyl-amine, 4-(4-Dimethylamino-1-naptylazo)-3-methoxybenzene sulfonic acid, Bindschedler's Green TM, and p-(p-dimethylaminophenylazo)benzoic acid, or (2) a binary mixture of:

(A) one or more of a Group I body of compounds soluble in said solvent consisting of the halogenated sulfonphthaleins and the organic acids having a $pK_1$ less than about four; and (B) one or more of a Group II body of compounds consisting of the aminotriphenylmethanes and their soluble salts, 8-hydroxyquinoline, and the cyanines; wherein the weight ratio of the Group I body of compounds to the Group II body of compounds is more than or about 3 to 1 and with the proviso that if the Group II compounds consist solely of one or more aminotriphenylmethanes or their soluble salts, then the Group I compound must be selected from one or more of the group consisting of oxalic acid, suitable soluble sulfonic acids, and the tetrahalogenated sulfonphthaleins, and the other organic acids having a $pK_1$ of less than or about 2, and (3) one or more of the aforesaid Group III body of compounds with one or more of the Group I or Group II bodies of compounds.

If a Group I-II combination is used, preferably the Group I body of compounds are one or more of the group consisting of oxalic acid, bromophenyl blue, bromothymol blue, chlorophenol red, bromochlorophenyl blue, bromocresol green, 3,4,5,6-tetrabromophenolsulfonphthalein, 2-naphthalene-sulfonic acid, trichloroacetic acid, chloroanilic acid, bromophenol red, and chlorocresol green and preferably the Group II body of compounds are one or more of the group consisting of ethyl red, crystal violet, pararosaniline, pararosaniline acetate, 3-ethyl-2-[5-(3-ethyl-2-benzothiazolinylidene)-1,3-pentadienyl]-benzothiazolium iodide, basic fuchsin, 8-hydroxyquinoline, ethyl violet, brilliant green, dicyanine A, pinacyanol chloride, 1-ethylpyridinium iodide, 3,3'-diethylthiodicarbocyanine iodide, and cryptocyanine. Most preferably, if a Group I-II composition is used, the Group I compounds consist of the halogenated sulfonphthaleins having a $pK_1$ of about 2 and a $pK_2$ of about 7 to about 9.

If a Group III compound above is employed, preferably it is pinacyanol iodide or quinaldine red. The weight percentage or organic moieties Group I-III in the heat sensitive composition is from about 0.025 to about 0.05% by weight of the solvent and organic moieties in the heat-sensitive composition. If a clinical thermometer is involved, the predetermined temperature is preferably from 96° F. to 105° F. and the thermometer has a number of pockets measuring temperature at 0.2° F. intervals.

The solvent in the heat-sensitive composition is preferably selected from one or more of the group consisting of ortho-chloronitrobenzene, ortho-bromonitrobenzene, 1-thymol, 2-naphthol, 2-ethoxybenzamide, and naphthalene for the temperature ranges bounded by their respective melting points taken individually or in some combination.

If a clinical thermometer is desired, the solvent in the heat-sensitve composition is preferably a binary mixture of ortho-chloronitrobenzene (OCNB) and ortho-bromonitrobenzene (OBNB), having a proportion of ortho-chloronitrobenzene to ortho-bromonitrobenzene of about 43.8:56.2 to about 4.0:96.0.

Preferably, the composition of matter of the present invention has a matrix-forming amorphous material of polyisobutylene. Likewise, the composition of matter of the present invention has a film-forming material selected from the group consisting of paraffin wax and low molecular weight polyethylene. The solubilizing compound preferably has the formula $C_nH_{2n-1}OH$ wherein n is in the range of 18 to 24. Most preferably, the solubilizing compound is docosanol. Most preferably, if a clinical thermometer is desired, our composition of matter has a heat-sensitive composition which consists essentially of pinacyanol iodide and a mixture of ortho-chloronitrobenzene and ortho-bromonitrobenzene, (OCNB-OBNB) as indicated above, wherein the pinacyanol iodide is 0.035 weight percent of the total weight of it and OCNB-OBNB. The amount of pinacyanol iodide may be increased to about 0.045 weight percent to increase the depth of color in applications where a thin layer is used.

The present system thus successfully provides a system which overcomes the aforementioned processing difficulties of the temperature indicating compositions of matter. A composition of matter is obtained that can be regenerated at temperatures higher than that previously used in the art.

More notably, a composition of matter is provided with a temperature indicating composition of matter component that can be distributed evenly throughout a matrix. Where a NTICM was employed, regeneration of the thermometer surprisingly occurred at 4° C., a temperature found in common household refrigerator, whereas without using the invention, temperatures as low as −40° C. to −70° C. were needed. Heat sealing of pockets can be avoided.

FIG. 1 depicts a general diagram for making the novel compositions of matter of the instant invention.

DESCRIPTION OF THE PREFERRED EMBODIMENTS

Figure 1:
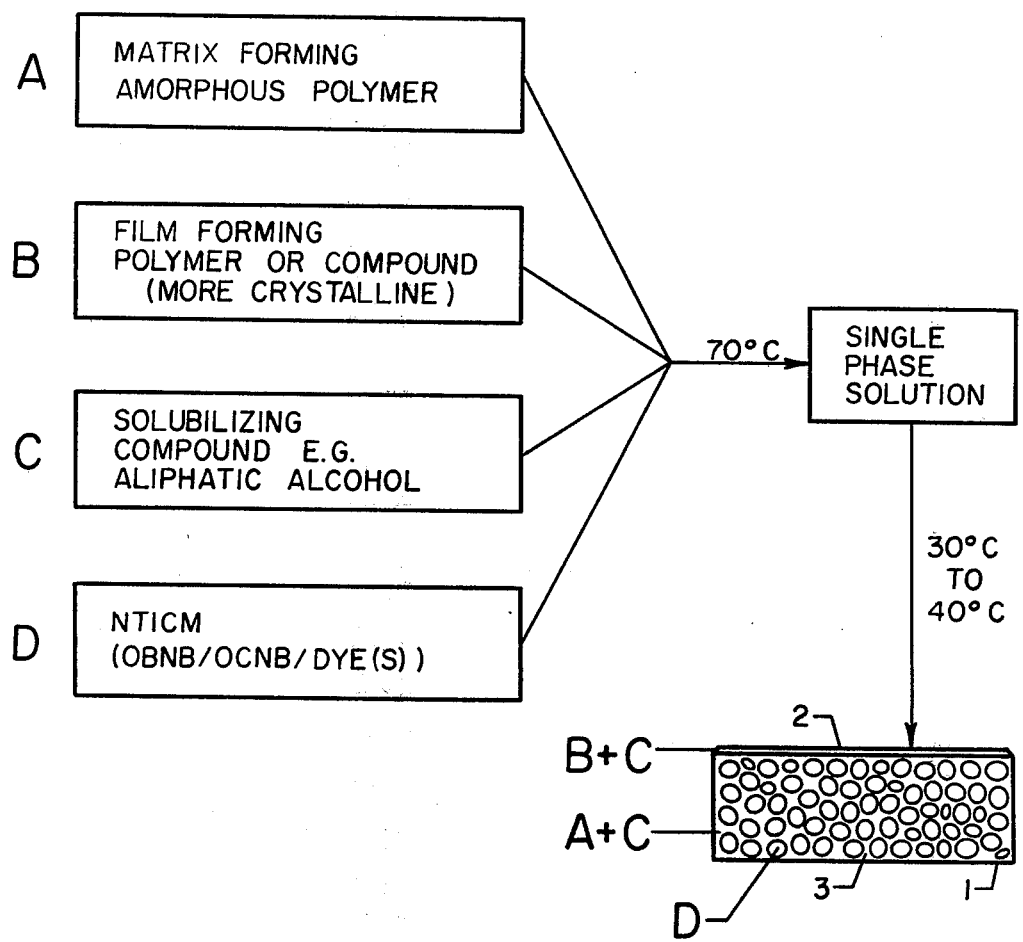

We have found that an improved composition of matter is achieved by (a) mixing (1) a suitable matrix-forming amorphous material, (2) a suitable film-forming polymer or compound more crystalline than the matrix-forming amorphous material, and (3) a suitable heat-sensitive temperature indicating composition of matter (HSTICM), (b) heating the resulting mixture sufficiently to form a single phase solutin (generally about 65°–70° C.), and (c) cooling same (generally to 40°–50° C.) to result in the temperature indicating composition of matter being dispersed in a porous, permeable matrix comprising the matrix-forming amorphous material containing a dispersed HSTICM which is a liquid; the material has placed above it a film of more crystalline material. In the alternative, as indicated by the Examples, the suitable matrix-forming compound and suitable film-forming compound are mixed first, heated to form a single phase solution, after which the HSTICM is added. Preferably, a suitable solubilizing compound is mixed with the matrix-former and film-former prior to the heating step. The NTICM of Ser. No. 946,935 is but one type of HSTICM. Reference is made to the general flow diagram in FIG. 1, which illustrates that after formation, a cavity 1 containing the cooled novel compositions has a film 2 comprising a suitable film forming material B and solubilizing compound(s) C (optional), while the internal portion 3 of the composition comprises droplets of the novel heat-sensitive and temperature-indicating compositions D dispersed in a combination of the amorphous A and film-forming B compounds. In a preferred embodiment, a solubilizing compound C, such as a high molecular weight weight aliphatic alcohol can be added to the mixture, wherein the solubilizing compound C is distributed throughout both the resulting matrix and the covering film. Though not depicted in FIG. 1, it is our belief that microporous channels exist which interconnect adjacent droplets D.

There are several general requirements which must be met by (a) the suitable matrix-forming amorphous material, (b) the suitable film-forming material, and (if used) (c) the solubilizing compound. The product of the combination of (a) and (b) or (a), (b) and (c) must meet the following criteria:

1. be soluble in the heat-sensitive temperature-indicating composition of matter (HSTICM) at a temperature of from about 25° C. to about 35° C. above the melting point of the HSTICM;
2. be insolube in the HSTICM below the melting point of the HSTICM, plus at least 5° C., and preferably at least about 15° C.;
3. be a non-solvent for the [HSTICM] phase/color change agents ("suitable organic moieties" in Ser. No. 946,935's NTICM, e.g., if Ser. No. 946,935's NTICM are employed, Group I plus Group II or Group III above (or plus Group I, II, or I–II));
4. be inert toward the HSTICM (e.g., with NTICM, not be reactive with Group I–III moieties); and
5. have a melting point at least 15° C. above the melting point of the HSTICM.

A suitable matrix-forming amorphous material is any nonpolar material substantially free of crystallites capable of forming a matrix with the HSTICM dispersed within the matrix, and having the aforementioned properties (1)–(5); in many instances, they are polymers or microcrystalline waxes (branched chain hydrocarbons) lacking a sharp melting point. Examples for a heat-sensitive temperature-indicating composition of matter using OCNB-OBNB and pinacyanol iodide (0.035 weight percent) are low density polyethylene and microcrystalline waxes. Specific examples are:

| | |
|---|---|
| FORTREX XFQ ® by | Western Petro Chemical, Inc. |
| | Box 558 |
| | Chanute, Kansas 66720 |
| AC Polyethylene 1702 TM by | Allied Chemical Corp. |
| (we used material | Specialty Chemical Div. |
| from lot 80741) | Morristown, N. J. 07960 |
| MULTIWAX ML 445 TM by | Witco Chemical Co. |
| x 145 A | Sonneborn Div. |
| (we used material | 277 Park Avenue |
| from lot 2845) | New York, New York 10017 |
| HOMOPOLYMER 617A TM by | Allied Chemical Co. |
| | Morristown, N. J. 07960 |
| OPPONOL B-3 ® | BASF |
| polyisobutylene by | Ludwigshafen, West Germany |
| and | |
| PAXWAX TM by | Paxwax National Wax Co. |
| | 3650 Touhy Avenue |
| | Skogie, Ill. 60076 |

Each of the above criteria (1)–(5) must be checked to insure that a suitable material is obtained for the HSTICM involved. For example, in a NTICM system using OCNB-OBNB, polystyrene is unsuitable since it is soluble in the OCNB-OBNB solvent. However, low density polyethylene, amorphous polypropylene, low molecular weight polyisobutylene (PIB), and microcrystalline waxes are excellent.

A suitable film-forming material is any nonpolar material having properites (1)–(5) above, is substantially crystalline and is more crystalline than the suitable amorphous material. Preferably, it melts at least 10° C. higher than the melting point of the HSTICM if a NTICM is used. Examples include:

low molecular weight polyethylene/paraffin blends having a low melting point but without flaking, such as HISTOWAX ® HX482, Matheson, Coleman and Bell, Manufacturing Chemists, Rutherford, N.J., or Norwood, Ohio 45212; and paraffin waxes and blends thereof (usually straight-chain and branched hydrocarbons).

The solubilizing agent, which is optional but preferably employed, in addition to properties (1)–(5) above, has the following properties:

(1) it solubilizes the HSTICM in the balance of the composition at high temperatures in order to make manufacture possible at lower temperatures;

(2) it is insoluble and inert toward the HSTICM at low temperatures;

(3) it has a melting point at best about 10° C. above (and preferably about 25° C. above) the temperature to be measured;

(4) it is inert to the suitable matrix-forming amorphous and film-forming materials;

(5) it is not opaque, but is clear or translucent; and (6) it encapsulates materials inert to it.

Solubilizing agents for use in the present invention include inter alia, high melting point saturated aliphatic alcohols, preferably of the general formula $C_nH_{2n-1}OH$, where n is a number from 18 to 24. Representative examples include stearyl alcohol (m.p. 58° C.), eicosanol (m.p. 65° C.), and docosanol (m.p. 71° C.). If a solubilizing agent is not employed, the temperature at which the amorphous and film-forming materials can be blended with the HSTICM to form a homogenous liquid is elevated - often at least 30° C., to as much as 95° C.-100° C.

As one skilled in the art well appreciates, some experimentation, not undue, is required to determine effective proportions of components (i.e., effective amounts of each component) in a given system employing a suitable:

(1) HSTICM;
(2) matrix-forming amorphous material;
(3) film-forming material; and
(4) (optional) solubilizing compound.

With respect to the HSTICM, it may constitute from 40 to about 70 weight percent of the entire composition. If too little HSTICM is employed, the color is too faded/light or "washes out"; if too much is employed, a poor matrix is formed or there is an incomplete film on the surface of the novel composition.

The suitable matrix-forming amorphous material is generally present from about 20% to about 40% by weight. If too little amorphous material is used, the matrix is weak; if too much is used, the color washes out.

The film-forming material is present in an amount generally less than 20 weight percent. If too much is used, a weak matrix is formed or the color washes out; if too little is used, an incomplete film exists, which might allow the HSTICM to sublime away through the overlapping layer covering the pocket in which the novel composition exists.

A suitable solubilizing compound, if used, is generally from about twenty to twenty-five percent. Too much solvent produces a weak porous film at the surface of the composition, or a compromised matrix permeated with crystals. Too little solvent only results in a difficult manufacturing process requiring a higher temperature (generally, at least about 30° C.) to form a homogenous liquid, as mentioned above.

Of course, as one skilled in the art will appreciate, by varying the ratios of the components involved and by substituting components, the solution temperature and other properties can be changed.

An especially preferred composition is that in which:

(a) the HSTICM is that described in Ser. No. 946,935 (NTICM) as 0.035 weight percent pinacyanol iodide (Fluka Catalogue #80560, distributed in the U.S.A. by Tridon Chemical Co., 255 Oser Avenue, Hauppauge, N.Y. 11787) in OCNB-OBNB having a proportion of OCNB to OBNB of about 43.8:56.2 to about 4.0:96.0 in order to measure temperatures from 96° F. to 104.80° F., the NTICM is present as 48 weight percent of the entire composition;

(b) the suitable matrix-forming amorphous material is polyisobutylene (PIB), such as BASF's OPPANOL TM B-3, and is 26% by weight of the entire composition;

(c) the suitable film-forming material is HISTOWAX ® HX482, and is 5% by weight of the entire initial composition; and (d) docosanol ($C_{22}H_{46}$ by Fluka Catalogue #43960) is used as a solubilizer and is present as 21% of the composition.

As stated, (a), (b), (c) and (d) are mixed; the mixture is stirred and slowly heated to at least 65° C. (but not more than 90° C.) to form a homogenous solution of one phase; preferably, the mixture is heated to about 70° C. Note that at 90° C., the mixture changes color, indicating degradation of the pinacyanol iodide. After cooling to about 40°–45° C., the components other than the NTICM become insoluble, and will precipitate to form a capped matrix (see FIG. 1). The amorphous material forms a matrix to hold the liquid NTICM in place and reduce crystal growth. The crystalline film-forming component forms a capping film over the matrix. The solubilizing agent begins to crystallize as the composition is cooled, having the effect of reducing the solubility of the amorphous and film-forming components. When cooled to about 40°–45° C., the solubilizing agent is partly dissolved in the other components, and partly exists in finite crystals within the solid ameliorated rendering novel mass. The NTICM is encased in the mass as dispersed droplets until it is chilled further to crystallize. DSC (differential scanning colorimeter) analysis indicated that the encased NTICM is essentially pure at about 99.8% to 99.9% by weight purity. The novel composition can then indicate temperature, like the corresponding TEMPA-DOT ®, READY STRIP ® thermometer sold by Organon Inc., of West Orange, New Jersey.

Although the invention has been described with reference to specific embodiments above, numerous variations and modifications will become evident to those skilled in the art, without departing from the scope and spirit of the invention as described above, defined in the appended claims, and as shown in the following Examples:

EXAMPLE I

This example demonstrates formation of a single phase of a novel composition of our invention at a relatively high temperature, and formation of a separate solid phase at a lower temperature.

The components used were as follows:
(a) NTICM—0.035 weight percent pinacyanol iodide as in OCNB-OBNB as in TEMPA DOT®, READY STRIP® thermometer, 40 weight percent of entire composition;
(b) Amorphous material—FORTEX XFQ®, 20 weight percent of composition; and
(c) Film-Forming Material—HISTOWAX® HX482, 40 weight percent of composition.

No solubilizing agent was used.

A blend of (b) and (c) was melted at about 100° C.; the NTICM (a) was added and stirred, and the temperature held at 90°–100° C. The mixture was poured into a dish and allowed to cool to about 22° C., where the waxes separated and the composition formed a rigid solid mass, while the NTICM was liquid.

A sample of the material made was cooled to about −70° C., where the NTICM recrystallized and became light violet.

Another sample of the material was heated to about 40° C., whereupon the composition turned from light violet to a deep dark blue.

EXAMPLE II

In view of the relatively high solution-forming temperature of the last Example, a solubilizing compound was added.

The components used were as follows:
(a) NTICM—same as Example I, 35 weight percent;
(b) amorphous material—MULTIWAX ML445 TM (Witco), 30 weight percent;
(c) film-forming material—HISTOWAX® HX482, 25 weight percent;
(d) olelyl alcohol, 10 weight percent.

The same procedure was followed as in Example I (heat (b), (c) and (d) to melting temperature, add (a)); the solution temperature, however, was only 60°–70° C. (about 65° C.). After stirring, the mixture was stored at 70° C., then poured into an aluminum dish. Resulting colors: light blue (solid); blue (liquid).

EXAMPLE III

The purpose of this Example is to try to keep the blue color of i.e., the liquid phase, as long as possible after cooling.

The components used were as follows:
(a) NTICM—same as Example I, 39 weight percent;
(b) amorphous material—MULTIWAX X145A TM, 16 weight percent;
(c) film-forming material—HISTOWAX® HX482, 33 percent; and
(d) solubilizing component - stearyl alcohol, 12 weight percent.

Components (b)–(d) were heated to 65°–70° C. Component (a) was added, and the composition stirred. Following storage at 70° C., the composition was poured into an aluminum dish. Resulting colors: blue grey color (solid); blue (liquid). Solution temperature: 70° C.

EXAMPLE IV

The purpose of this Example was to find a formula that would hasten the recrystallization process using stearyl alcohol as the dispersing agent.

The components used were as follows:
(a) NTICM—same as Example I, 50 weight percent;
(b) amorphous material—polyisobutylene by BASF (Opponon B-3 ®), 25 weight percent;
(c) film-forming material—HISTOWAX® HX482, 5 weight percent; and
(d) stearyl alcohol, 20 weight percent.

Components (b)–(d) were heated to 65°–76° C.; melted NTICM (a) was added. The entire solution was stirred, then stored at 70° C. Later, some of it was poured in an aluminum dish. Resulting colors: rose tan (solid); blue (liquid).

EXAMPLE VI

In this experiment, several potential film formers, solubilizers (optional), and matrix forming amorphous polymer compounds formed novel compositions in the usual manner, together with a NTICM of 0.035 percent pinacyanol iodide in OCNB-OBNB. The components used and results obtained are given in the following Table:

TABLE

| FIlM-* FORMER | MATRIX-* FORMER | SOLUBILIZER* | COLOR OF CHEM. SOLID | SOLN. TEMP. | DESCRIPTION | RECRYSTALLIZATION STABILITY | MPD |
|---|---|---|---|---|---|---|---|
| 1. HISTOWAX® HX482 | AC POLYETHYLENE 1702 TM | Stearyl Alcohol | Light Blue | 73° C. | HISTOWAX® HX482 forms a thin film on the surface. POLYETHYLENE forms a matrix. It is a permeable wax. | Recrystallize at RT in a day. | |
| 35% | 15% | 10% | | | | | |
| 2. HISTOWAX® HX482 | MULTIWAX X145A TM | Stearyl Alcohol | Blue gray | 70° C. | HISTOWAX® HX482 forms a thin film on the surface while MULTIWAX X145A TM forms a matrix. It gave a porous as well as a permeable wax mixture. | Blue color stable in 4 days. | OK |
| 33% | 16% | 12% | | | | | |
| 3. HISTOWAX® HX482 | MULTIWAX X145A TM | Tetracosane | Violet | 90° C. | HISTOWAX® HX482 forms a thin film and MULTIWAX X145A TM forms a matrix. Solid doesn't have good dispersion. Solidified sample showed separated chemicals. | — | |
| 33% | 16% | 13% | | | | | |
| 4. HISTOWAX® HX482 | MULTIWAX X145A TM | Tricosane | Violet | 85° C. | Does not have good dispersion. Solidified wax showed sepa- | — | |

TABLE-continued

| | FILM-* FORMER | MATRIX-* FORMER | SOLU-BIL-IZER* | COLOR OF CHEM. SOLID | SOLN. TEMP. | DESCRIPTION | RECRYSTAL-LIZATION STABILITY | MPD |
|---|---|---|---|---|---|---|---|---|
| 5. | 33% HISTOWAX® HX482 | 16% MULTIWAX X145A ™ | 13% Octacosane | Violet | 85° C. | rated chemicals. Does not have good dispersion. Solidified wax showed separated chemicals. | — | |
| 6. | 36.7% HISTOWAX® HX482 | 17.8% MULTIWAX X145A ™ | 14.4% 9 heptadecanone | Violet | 70° C. | HISTOWAX® HX482 forms a delicate thin film. MULTIWAX X145A ™ forms a matrix. | Recrystallize in a day. | |
| 7. | 31.6% Paraffin, flake | 15.3% Petrolatum | 12.4% Stearyl Alcohol | Light Violet | 65–70° C. | Waxes form a matrix w/chem. It is a soft and permeable wax. | Complete recrystallize in a day. | |
| 8. | 30.0% Paraffin, flake | 20.0% PETROLATUM X145A ™ | 12.0% Hexadecanol | Light Violet | 65–70° C. | Waxes form a matrix. It is a soft and permeable wax. | Partially recrystallize in 2 days. | |
| 9. | 30.0% HISTOWAX® HX482 | 20.0% MULTIWAX X145A ™ | 12.0% 1 Eicosanol | Light Blue | 65–70° C. | HISTOWAX® HX482 forms a delicate thin film on surface. MULTIWAX X145A ™ forms a matrix. It is a soft, porous and permeable wax. | Blue color is stable in 2 days. | >1.2 |
| 10. | 33.0% HISTOWAX® HX482 | 16.0% PAXWAX ™ | 12.0% Hexadecanol | Light Purple | 73° C. | HISTOWAX® HX482 forms a thin film on surface. PAXWAX ™ forms a matrix. It is a porous as well as a permeable wax. | Blue color stable in a day. | |
| 11. | 35% HISTOWAX® HX482 | 25% MULTIWAX 445 ™ | 5% Hexadecanol | Light Purple | 70° C. | HISTOWAX® HX482 forms a thin film on surface. MULTIWAX 445 ™ forms a matrix. It is a medium soft wax w/c is porous as well as permeable. | Blue color stable in a day. | >1.2 |
| 12. | 35% HISTOWAX® HX482 | 25% AC POLYETHYLENE 1702 ™ | 5% Hexadecanol | Light Purple | 73° C. | HISTOWAX® HX482 forms a thin film on surface. AC POLYETHYLENE 1702 ™ forms a matrix. It is a soft and permeable wax. | Recrystallize in a day. | >1.2 |
| 13. | 45% Paraffin | 10% HOMOPOLYMER 617A ™ | 7% Hexadecanol & Ethylene vinyl acetate | Light Purple | 75° C. | Paraffin and HOMOPOLYMER 617A ™ forms a matrix. It is a soft, permeable wax. | Recrystallize in a day. | >1.2 |
| 14. | 45% HISTOWAX® HX482 | 10% FORTEX XFQ ™ | 10% — | Light Violet | 100° C. | HISTOWAX® HX482 forms a delicate thin film on top. FORTEX XFQ ™ forms a matrix. A hardwax w/c is porous as well as permeable. | Blue color stable in a week. | >1.2 |
| 15. | 35% HISTOWAX® HX482 | 17% MULTIWAX X145F ™ | 0% Oleyl alcohol | Light Purple Blue | 70° C. | HISTOWAX® HX482 forms a thin film on top. MULTIWAX X145 ™ forms a matrix. Medium soft wax w/c is porous as well as permeable. | Blue color stable in a week. | >1.2 |
| 16. | 25% HISTOWAX® HX482 | 30% PAXWAX ™ | 10% Oleyl alcohol | Light Purple | 70° C. | HISTOWAX® HX482 forms a thin film on surface. PAXWAX ™ forms a matrix. It is a porous, permeable wax. | Blue color stable for 3 days. | >1.2 |
| 17. | 28% HISTOWAX® HX482 | 30% MULTIWAX X145A ™ | 5% 1 Docosanal | Light Blue | 65–70° C. | HISTOWAX® HX482 forms a delicate thin film on surface. MULTIWAX X145 ™ forms a matrix. It is a soft, porous, as well as a permeable wax. | Blue color is stable. | >1.2 |
| | 33% | 16% | 12% | | | | | |

MPD - Melting Point Depression
*Percentages: weight percent in total composition, balance is 0.035% pinacyanol iodide in OCNB:OBNB (10:30)

What is claimed is:

1. A composition of matter comprising:

(1) a heat-sensitive composition capable of reversibly changing color at a predetermined temperature comprising at least one heat-sensitive phase/color change agent and present in a quantity of from about 40% to about 70% by weight;
(2) a non-polar matrix-forming amorphous material present in a quantity of from about 20% to about 40% by weight; and
(3) a non-polar film-forming material that is more crystalline than said matrix-forming amorphous material and present in a quantity to form a film over said matrix having said heat-sensitive composition dispersed therein sufficient to prevent subliming of said heat-sensitive composition therethrough, and capable of forming a matrix having said heat-sensitive composition dispersed therein, with the proviso that at least each of (2) and (3) is
  (a) soluble in said heat-sensitive composition at a temperature of from about 25° C. to about 35° C. above the melting point of said heat-sensitive composition;
  (b) insoluble in said heat-sensitive composition below the melting point thereof plus at least 5° C.;
  (c) a non-solvent for any heat-sensitive composition phase/color change agents;
  (d) inert toward said heat-sensitive composition; and
  (e) possessed of a melting point at least 15° C. above the melting point of said heat-sensitive composition.

2. The composition of claim 1 further comprising a solubilizing agent for said heat-sensitive composition and present in a quantity of from about 20% to about 25% by weight, said solubilizing agent being
  (a) soluble in said heat-sensitive composition at a temperature of from about 25° C. to about 35° C. above the melting point of said heat-sensitive composition;
  (b) insoluble in said heat-sensitive composition below the melting point thereof plus at least 5° C.;
  (c) a non-solvent for any heat-sensitive composition phase/color change agents;
  (d) inert toward said heat-sensitive composition;
  (e) possessed of a melting point at least 15° C. above the melting point of said heat-sensitive composition;
  (f) capable of solubilizing said heat-sensitive composition in the balance of the composition at high temperatures in order to make manufacture possible at lower temperatures;
  (g) insoluble and inert toward said heat-sensitive composition at low temperatures;
  (h) possessed of a melting point at least 10° C. above the temperature to be measured;
  (i) inert to said matrix-forming amorphous material and said filmforming material;
  (j) clear or translucent; and
  (k) capable of encapsulating materials inert to said solubilizing agent.

3. The compositions of matter of claim 1, wherein said heat-sensitive composition is substantially free of impurities and consisting essentialy of:
  (a) a solvent adapted to change from a solid state to aliquid state at substantially a predetermined temperature; and
  (b) an effective amount of one or more suitable organic moieties dissolved in and inert towards said solvent and adapted to change the color of the composition visible to the naked eye upon the change in state at substantially the predetermined temperature when so dissolved, and selected from one or both of the groups consisting of:
(1) one or more of a Group III body of compounds consisting of pinacyanol iodide, 1,1'-diethyl-2,2'-cyanine iodide, quinaldine red, pinacyanol chloride, thionin, methylene blue, cresol red, chlorophenol red, neutral red iodide, neutral red chloride, crystal violet, acridin orange, Orasol Orange RLN TM, Orasol Navy Blue TM, Irgalith Red PR TM, Fat REd BS TM, Xylene Cyanol FF TM, Rhodamine B TM, Rhodamine 6G TM, Irgalith Magneta TCB TM, Irgalith Pink TYNC TM, Toluidine Blue O TM, Savinyl Green B TM, Savinyl Blue RS TM, purpurin, 3,3'-diethylthiadicarboxyanine iodide, cryptocyanine, Dicyanine A TM, Merocyanine 540 TM, 4-(p-ethoxyphenylazo)-m-phenylene diamine monohydrochloride, Yellow Orange S TM, Chrysoidan G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, Murexide, Savinyl Blue GLS TM, Irgalith Blue GLSM TM, phthalocyanine, Di Amingreen B TM, Alizarin Blue S, Celliton Blue Extra TM, neocyanine, Janus Green TM, dimethyl yellow, Fast Yellow TM, methyl red sodium salt, Alizarin yellow R TM, Eriochrome black T TM, Chromotrope 2R TM, Ponceau 6R TM, Brilliant Ponceau G/R/2R, chomolan yellow, Sudan Red B TM, Bismarck brown G, Fat Black TM, Resorcin Brown TM, Benzofast pink 1BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosinscarlet, Eosin Yellowish TM, Erythrosin extra bluish, 4'5-dibromo fluorescein, ethyleosin, Phloxine TM, Cyanovin b TM, chlorocresol green, pinacyanol bromide, 2-(p-dimethylaminostyryl)-1-ethyl pyridinium iodide, ethyl red, nigrosine, Savinyl Blue B TM, Orasol Blue BLN TM, Safranin O TM, Azoicarnun G TM, Phenosafranine TM, Azocarmine BX TM, Solophenyl Brilliant Blue BL TM, Nile Blue a TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-Aminofluoresecein, Rose Bengal TM, Martius Yellow TM, Chicago Blue 6B TM, Alcian Blue 86X TM, cresyl violet, 4,4'Bis (dimethylamino)benzhydrol, Zinc Phthalocyanine, Sudan III TM, Pyronin Y TM, Toluylene Blue TM, cresyl violet perchlorate, Mendola's Blue TM, Phosphine Dye TM, Nitrol TM, cresyl violet acetate, ceres orange R TM, 4-phenylazo-1-naphthylamine, 4-(4-Dimethylamino-1-naptylazo)-3-methoxybenzene sulfonic acid, Bindschedler's Green TM, and p-(p-dimethylaminophenylazo)benzoic acid, or
(2) a binary mixture of:

(A) one or more of a Group I body of compounds soluble in said solvent consisting of the halogenated sulfonphthaleins and the organic acids having a $pK_1$ less than about four; and (B) one or more of a Group II body of compounds consisting of the aminotriphenylmethanes and their soluble salts; 8-hydroxyquinoline, and the cyanines;

wherein the weight ratio of the Group I body of compounds to the Group II body of compunds is more than or about 3 to 1 and with the proviso that if the Group II compounds consist solely of one or more aminotriphenylmethanes or their soluble salts, then the Group I compound must be selected from one or more of the group consisting of oxalic acid, suitable soluble sulfonic acids, and the tetrahalogenated sulfonphthaleins, and the other organic acids having a $pK_1$ of less than or about 2, and (3) one or more of the aforesaid Group III body of compounds with one or more of the Group I or Group II bodies of compounds.

4. The composition of matter of claim 3, wherein (a) the Group I body of compounds are one or more of the group consisting of oxalic acid, bromophenyl blue, bromothymol blue, chlorophenol red, bromochlorophenyl blue, bromocresol green, 3,4,5,6-tetrabromophenolsulfonphthalein, 2-naphthalene-sulfonic acid, trichloroacetic acid, chloroanilic acid, bromophenol red, and chlorocresol green, and (b) the Group II body of compounds are one or more of the group consisting of ethyl red, crystal violet, pararosaniline, pararosaniline acetate, 3-ethyl-2-[5-(3-ethyl-2-benzothiazolinylidene)-1,3-pentadienyl]-benzothiazolium iodide, basic fuchsin, 8-hydroxyquinoline, ethyl violet, brilliant green, dicyanine, pinacyanol chloride, 1-ethyl-pyridinium iodide, 3,3'-diethylthiodicarbocyanine iodide, and cryptocyanine.

5. The composition of matter of claim 4, wherein the weight percentage of organic moieties soluble in the solvent is from about 0.025 to about 0.05% of the weight of the solvent and said soluble organic moieites.

6. The composition of matter of claim 4, wherein the predetermined temperature is from about 96° F. to about 105° F.

7. The composition of matter of claim 4, wherein the solvent is selected from one or more of the group consisting of ortho-chloronitrobenzene, ortho-bromonitrobenzene, 1-thymol, 2-naphthol, 2-ethoxybenzamide, and naphthalene.

8. The composition of matter of claim 4, wherein the solvent is a binary mixture of ortho-chloronitrobenzene and ortho-bromonitrobenzene having a proportion of orthochloronitrobenzene to ortho-bromonitrobenzene of about 43.8:56.2 to about 4.0:96.0.

9. The composition of matter of claim 4, wherein the Group I compounds consist of the halogenated sulfonphthaleins having a $pK_1$ of about 2 and a $pK_2$ of about 7 to about 9.

10. The composition of matter of claim 1, wherein said matrix-forming amorphous material is polyisobutylene.

11. The composition of matter of claim 1, wherein said film-forming material is selected from the group consisting of paraffin wax, and low molecular weight polyethylene.

12. The composition of matter of claim 2, wherein said solubilizing compound has the formula $C_nH_{2n-1}OH$, wherein n is in the range of 18 to 24.

13. The composition of matter of claim 2, wherein said solubilizing compound is docosanol.

14. The composition of matter of claim 1, wherein said heat-sensitive composition consists essentialy of pinacyanol iodide and a mixture of ortho-chloronitrobenzene and orthobromonitrobenzene.

15. A composition of matter comprising:
(a) a heat-sensitive composition capable of reversibly changing color at a predetermined temperature substantially free of impurities consisting essentially of an effective amount of pinacyanol iodide in a solvent consisting of a mixture of orthochloronitrobenzene and ortho-bromonitrobenzene;
(b) polyisobutylene;
(c) HISTOWAX® HX482; and
(d) docosanol;
the weight ratio of (a):(b):(c):(d) being approximately 48:26:5:21.

* * * * *